(12) United States Patent
Lin et al.

(10) Patent No.: US 12,360,576 B1
(45) Date of Patent: *Jul. 15, 2025

(54) ROTATING SHAFT DEVICE

(71) Applicant: FOSITEK CORPORATION, New Taipei (TW)

(72) Inventors: Chun-Han Lin, New Taipei (TW); Yung-Chih Tseng, New Taipei (TW)

(73) Assignee: FOSITEK CORPORATION, New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/632,560

(22) Filed: Apr. 11, 2024

(30) Foreign Application Priority Data

Jan. 12, 2024 (TW) .................................. 113101408

(51) Int. Cl.
*G06F 1/16* (2006.01)

(52) U.S. Cl.
CPC ............ *G06F 1/1681* (2013.01); *G06F 1/166* (2013.01); *G06F 1/1667* (2013.01)

(58) Field of Classification Search
CPC ....... G06F 1/1681; G06F 1/166; G06F 1/1667
See application file for complete search history.

(56) References Cited

U.S. PATENT DOCUMENTS

| | | | | |
|---|---|---|---|---|
| 5,239,444 A * | 8/1993 | Sasaki | ................... | G06F 1/1684 361/679.44 |
| 6,097,595 A * | 8/2000 | Cipolla | ................... | G06F 1/166 248/688 |
| 7,990,692 B2 * | 8/2011 | Wang | ................... | G06F 1/1616 16/326 |
| 8,050,031 B2 * | 11/2011 | Wang | ................... | G06F 1/1681 361/679.55 |
| 8,792,237 B2 * | 7/2014 | Guo | ................... | G06F 1/1681 361/679.55 |
| 8,879,251 B2 * | 11/2014 | Hsiu | ................... | H05K 5/03 361/679.59 |
| 9,047,058 B2 * | 6/2015 | Yu | ................... | G06F 1/1679 |
| 9,696,764 B2 * | 7/2017 | Wolff | ................... | G06F 1/1681 |
| 10,241,540 B2 * | 3/2019 | Chuang | ................... | G06F 1/203 |

(Continued)

FOREIGN PATENT DOCUMENTS

CN 107368148 B * 4/2020 ............. G06F 1/162

*Primary Examiner* — Jeffrey O'Brien
(74) *Attorney, Agent, or Firm* — Birch, Stewart, Kolasch & Birch, LLP (57) ABSTRACT

A rotating shaft device includes a base, a rotation member, a slide member, a resistance-providing member, a supporting member, and a linkage unit. The rotation member is rotatable relative to the base between a first rotation position and a second rotation position. The slide member is slidable relative to the base between a first slide position and a second slide position. The resistance-providing member prevents the slide member from moving toward the first slide position when the slide member is in the second slide position. The supporting member is movable relative to the base between an initial position and a supporting position. The linkage unit is convertible between a folded state and an expanded state. When the rotation member is in the first rotation position, the slide member, the linkage unit, and the supporting member are respectively in the first slide position, the folded state, and the initial position.

7 Claims, 13 Drawing Sheets

(56) References Cited

U.S. PATENT DOCUMENTS

| | | | | |
|---|---|---|---|---|
| 10,503,214 B2* | 12/2019 | Jiang | ............... | G06F 1/166 |
| 10,534,408 B2* | 1/2020 | Cheng | ............... | G06F 1/1616 |
| 10,582,638 B2* | 3/2020 | Ye | ............... | G06F 1/1681 |
| 10,642,309 B2* | 5/2020 | Cheng | ............... | G06F 1/203 |
| 11,073,879 B2* | 7/2021 | Wang | ............... | G06F 1/206 |
| 11,169,575 B2* | 11/2021 | Elsey | ............... | G06F 1/1681 |
| 11,435,235 B2* | 9/2022 | McKittrick | ............... | G05B 15/02 |
| 11,644,872 B2* | 5/2023 | Lin | ............... | G06F 1/1692 |
| | | | | 345/173 |
| 11,714,462 B2* | 8/2023 | Shin | ............... | G06F 1/1681 |
| | | | | 361/679.27 |
| 11,775,027 B2* | 10/2023 | Onda | ............... | G06F 1/1679 |
| | | | | 361/679.12 |
| 11,797,060 B2* | 10/2023 | Zhong | ............... | G06F 1/203 |
| 12,147,277 B2* | 11/2024 | Wu | ............... | G06F 1/1662 |
| 12,204,380 B2* | 1/2025 | Park | ............... | G06F 1/1618 |
| 2011/0292605 A1* | 12/2011 | Chen | ............... | G06F 1/1681 |
| | | | | 16/303 |
| 2020/0341515 A1* | 10/2020 | Moser | ............... | G06F 1/1692 |
| 2021/0089077 A1* | 3/2021 | Wang | ............... | G06F 1/3287 |
| 2022/0397933 A1* | 12/2022 | Cha | ............... | G06F 1/1681 |
| 2023/0376082 A1* | 11/2023 | Yamamoto | ............... | G06F 1/1679 |
| 2024/0103570 A1* | 3/2024 | Huang | ............... | H05K 5/0226 |
| 2024/0152187 A1* | 5/2024 | Wen | ............... | G06F 1/203 |
| 2024/0385654 A1* | 11/2024 | Ku | ............... | G06F 1/1677 |

\* cited by examiner

ROTATING SHAFT DEVICE

CROSS-REFERENCE TO RELATED APPLICATION

This application claims priority to Taiwanese Invention Patent Application No. 113101408, filed on Jan. 12, 2024, the entire disclosure of which is incorporated by reference herein.

FIELD

The disclosure relates to a rotating shaft device, and more particularly to a rotating shaft device that may be used in an electronic device, such as a notebook computer.

BACKGROUND

When a user uses an electronic device such as a notebook computer, the user may need to use a heat dissipation rack to lift a rear side of the notebook computer so that a space for dissipating heat generated during operation of the notebook computer may be increased, and that the user may experience greater comfort when using a keyboard of the notebook computer. However, the heat dissipation rack is not easy to use or to store, and, when the heat dissipation rack is in use, stability of the heat dissipation rack is also yet to be further improved. How to conveniently and stably lift the rear side of the notebook computer when the user uses the notebook computer becomes a problem to be resolved.

SUMMARY

Therefore, an object of the disclosure is to provide a rotating shaft device that can alleviate at least one of the drawbacks of the prior art.

According to the disclosure, the rotating shaft device includes a base, a rotation member, a slide member, a resistance-providing member, a supporting member, and a linkage unit. The rotation member is disposed on the base, and is rotatable relative to the base about a rotation axis between a first rotation position and a second rotation position. The rotation axis extends in a left-right direction. The rotation member has a rotation guiding structure that at least partially surrounds the rotation axis. The slide member is disposed on the base, and is slidable relative to the base between a first slide position and a second slide position in the left-right direction. The slide member has a slide engaging structure that is coupled to the rotation guiding structure and that is slidable along the rotation guiding structure, and a slide guiding structure that extends in an up-down direction. The resistance-providing member interconnects the slide member and the base, and provides a force that prevents the slide member from moving toward the first slide position when the slide member is in the second slide position. The supporting member is disposed on the base, and is movable relative to the base between an initial position and a supporting position. The linkage unit includes a first link that is pivotally connected to the base, a second link that is located at one side of the first link, and that is pivotably connected to the first link and the supporting member, and a linkage engaging structure that is disposed at a junction of the first link and the second link, that is coupled to the slide guiding structure of the slide member, and that is slidable along the slide guiding structure. A portion of the second link peeks out from under the first link. The linkage unit is convertible between a folded state and an expanded state. When the rotation member is in the first rotation position, the slide member, the linkage unit, and the supporting member are respectively in the first slide position, the folded state, and the initial position. When the rotation member is rotated to the second rotation position, the slide member is urged by rotation of the rotation member to slide in the left-right direction to the second slide position and to convert the linkage unit into the expanded state, and the supporting member is urged by the second link of the linkage unit to move downwardly to the supporting position.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 1:
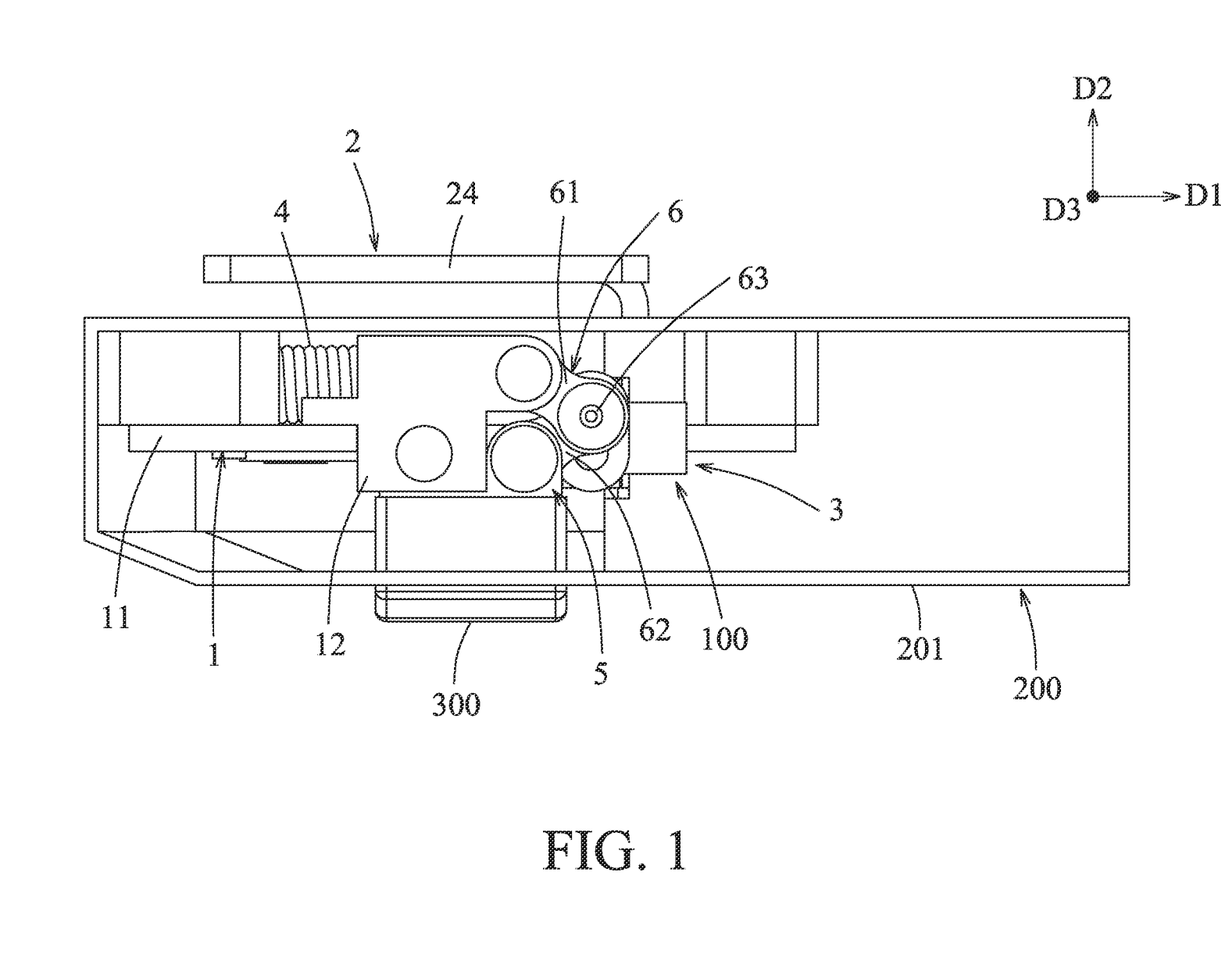
FIG. 1 is a schematic front view illustrating an embodiment of a rotating shaft device according to the disclosure mounted to an electronic device while a rotation member of the embodiment is in a first rotation position and a supporting member of the embodiment is in an initial position.
Figure 2:
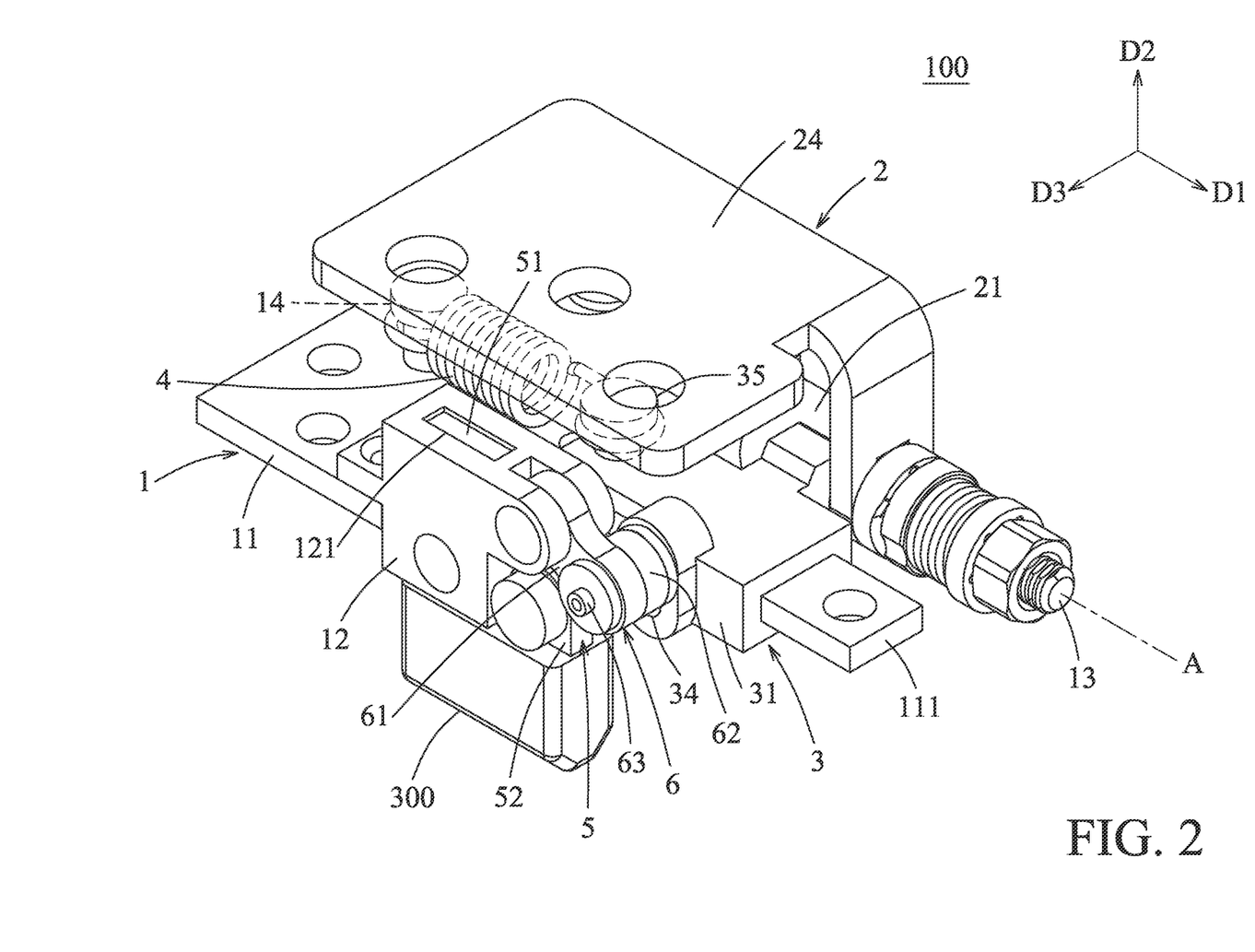
FIG. 2 is a perspective view of the embodiment illustrating the rotation member being in the first rotation position and the supporting member being in the initial position.
Figure 3:
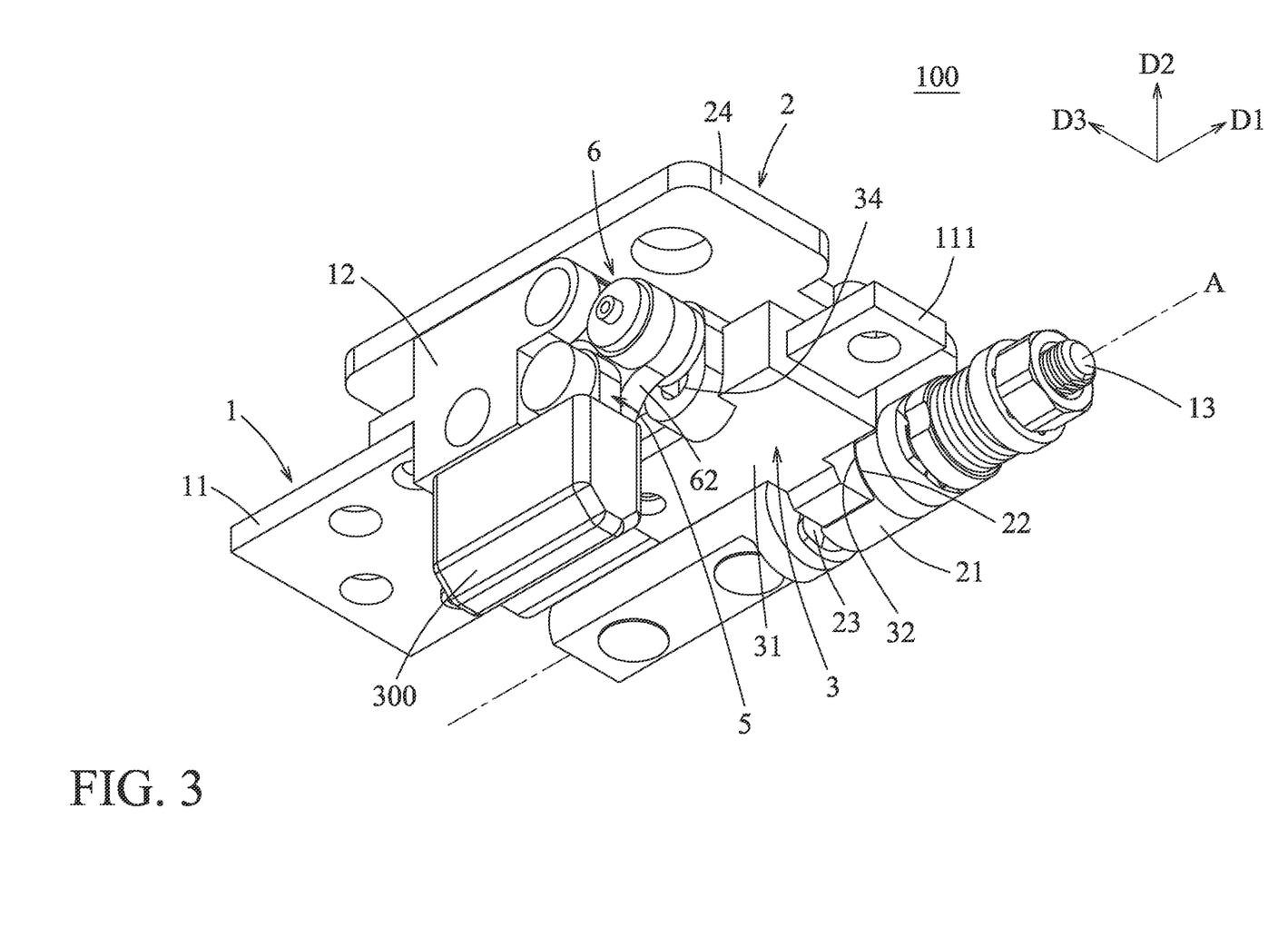
FIG. 3 is a perspective view of the embodiment viewed from another viewing angle.

Referring to FIGS. 1 to 3, an embodiment of a rotating shaft device 100 according to the disclosure is adapted to be used in an electronic device 200. The electronic device 200 may be, but not limited to be, a notebook computer. The electronic device 200 includes a first housing 201 and a second housing (not shown). The first housing 201 may be provided with, for example, a keyboard (not shown), a display (not shown), and a touchpad (not shown). The rotating shaft device 100 is adapted to interconnect the first housing 201 and the second housing so that the second housing can rotate relative to the first housing 201 (i.e., the electronic device 200 can be opened or closed). The rotating shaft device 100 includes a base 1, a rotation member 2, a slide member 3, a resistance-providing member 4, a supporting member 5, and a linkage unit 6.

Figure 4:
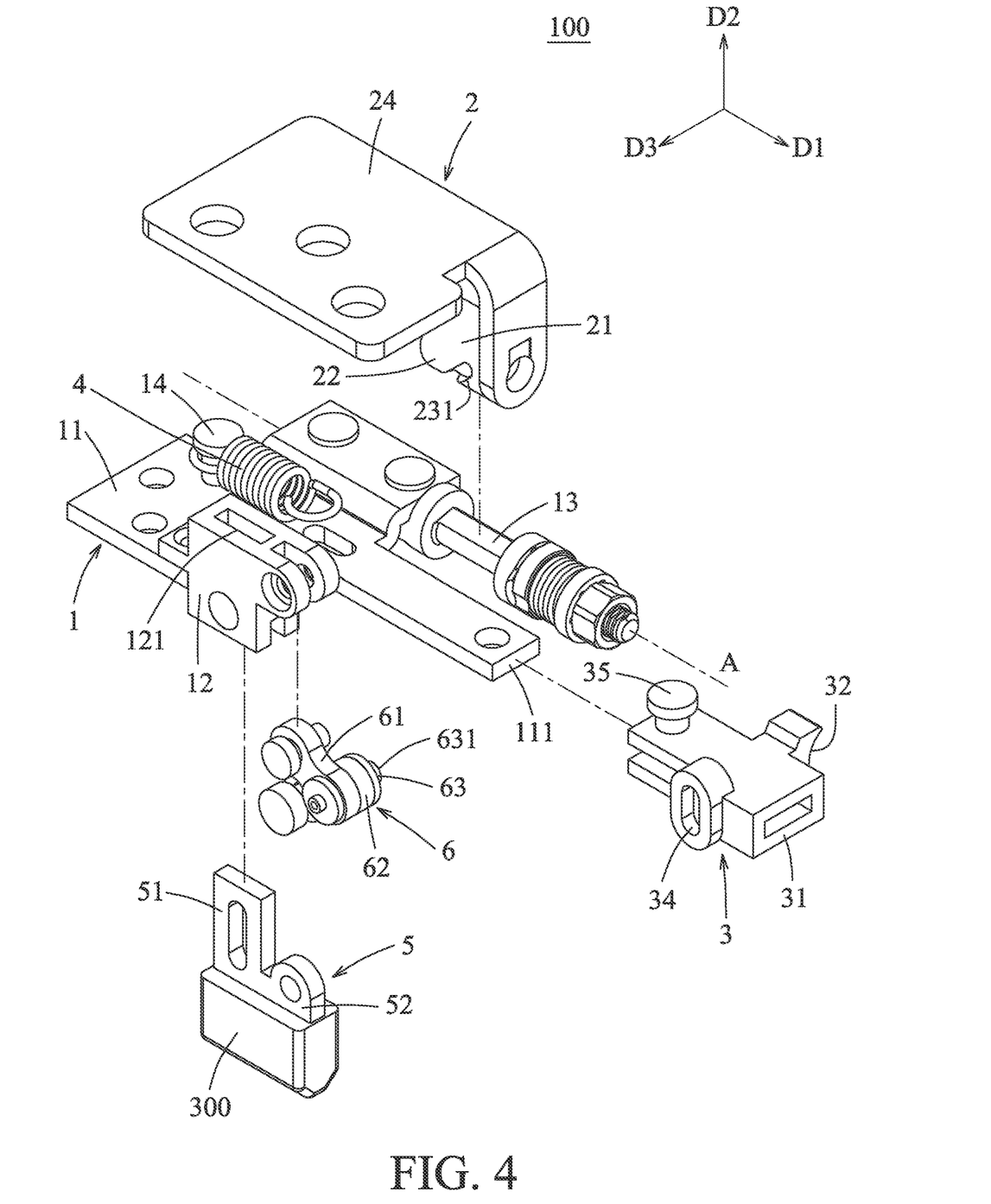
FIG. 4 is a partly exploded perspective view of the embodiment.

Referring to FIG. 4, in cooperation with FIGS. 1 to 3, the base 1 is adapted to be disposed on the first housing 201. The base 1 includes a first seat body 11, a second seat body 12, a rotation rod 13, and a connecting structure 14. The first seat body 11 is adapted to be mounted to a rear side of the first housing 201. The second seat body 12 is mounted to a front side of the first seat body 11. The rotation rod 13 is mounted to a rear side of the first seat body 11, and extends along a rotation axis (A) that extends in a left-right direction (D1). The connecting structure 14 is mounted to the first seat body 11. The first seat body 11 includes a guide rod 111 that extends in the left-right direction (D1). The second seat body 12 has a guide hole 121 that extends in an up-down direction (D2). It is noted that, in FIGS. 1 to 8, an arrow that represents the left-right direction (D1) points to a right side of the rotating shaft device 100, an arrow that represents the up-down direction (D2) points to an top side of the rotating shaft device 100, and an arrow that represents a front-rear direction (D3) points to a front side of the rotating shaft device 100. In this embodiment, the connecting structure 14 is configured to be a fastener (e.g., a bolt, a rivet, etc.).

Figure 5:
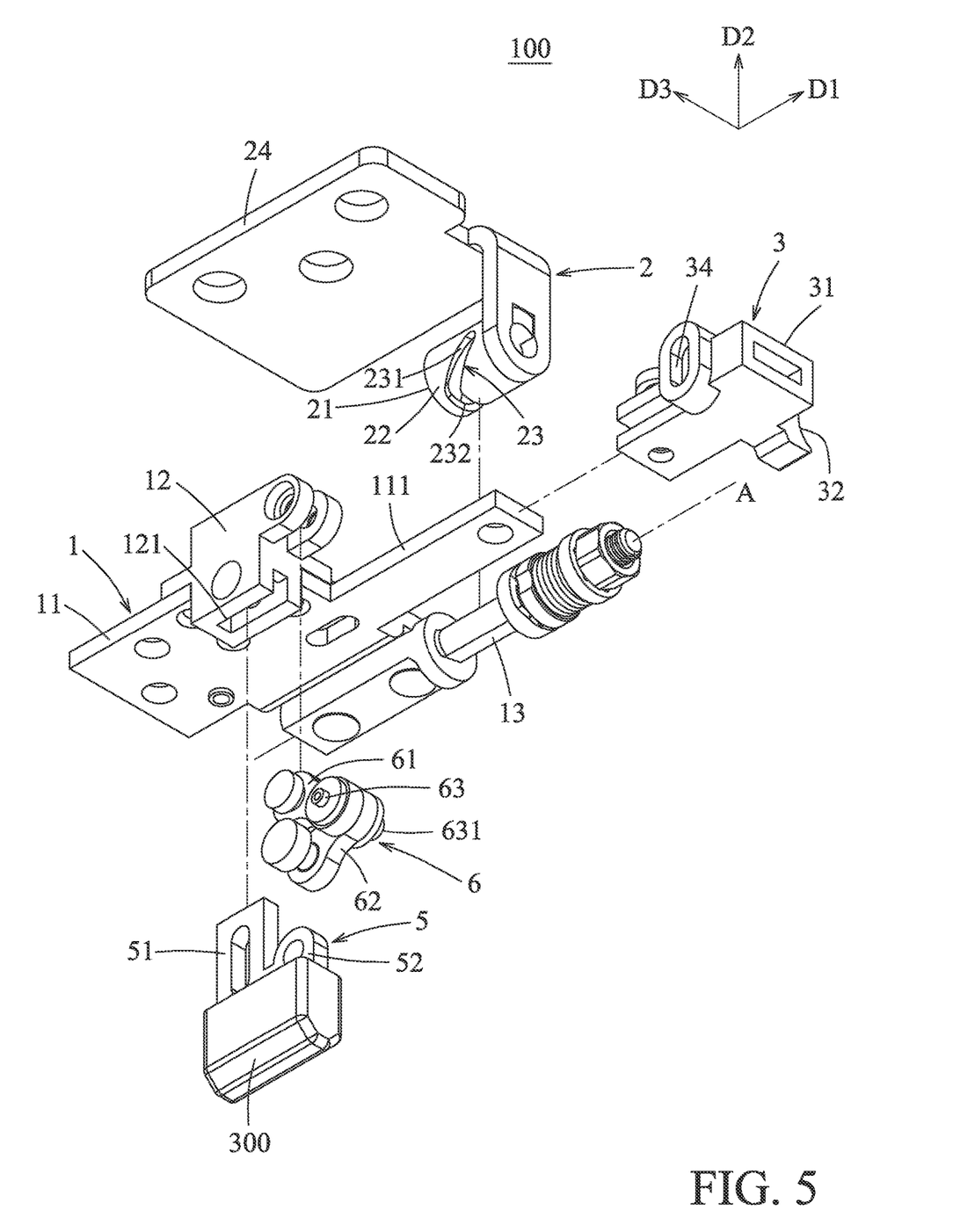
FIG. 5 is a partly exploded perspective view of the embodiment viewed from another viewing angle.

Referring to FIG. 5, in cooperation with FIGS. 2 to 4, the rotation member 2 is disposed on the rotation rod 13 of the base 1, and is adapted for the second housing to be disposed thereon. The rotation member 2 is rotatable relative to the base 1 about the rotation axis (A) among a first rotation position (see FIG. 2), a second rotation position (see FIG. 11), and a transition position (see FIG. 9) that is between the first rotation position and the second rotation position. The rotation axis (A) extends through the rotation rod 13 in the left-right direction (D1). The rotation member 2 has a rotary sleeve 21, a convex curved surface 22, a rotation guiding structure 23, and a mounting frame 24. The rotary sleeve 21 is rotatably sleeved on the rotation rod 13. The convex curved surface 22 is located on the rotary sleeve 21. The rotation guiding structure 23 is formed in the convex curved surface 22, is configured to be a groove, and at least partially surrounds the rotation axis (A). Specifically, the rotation guiding structure 23 has a guiding section 231 and a holding section 232. The guiding section 231 extends around the rotation axis (A) in a direction that is oblique to the left-right direction (D1). The holding section 232 is connected to the guiding section 231, and extends around the rotation axis (A) on an imaginary plane that has a normal vector in the left-right direction (D1). The mounting frame 24 extends from the rotary sleeve 21, and is adapted for the second housing to be mounted thereto.

Figure 6:
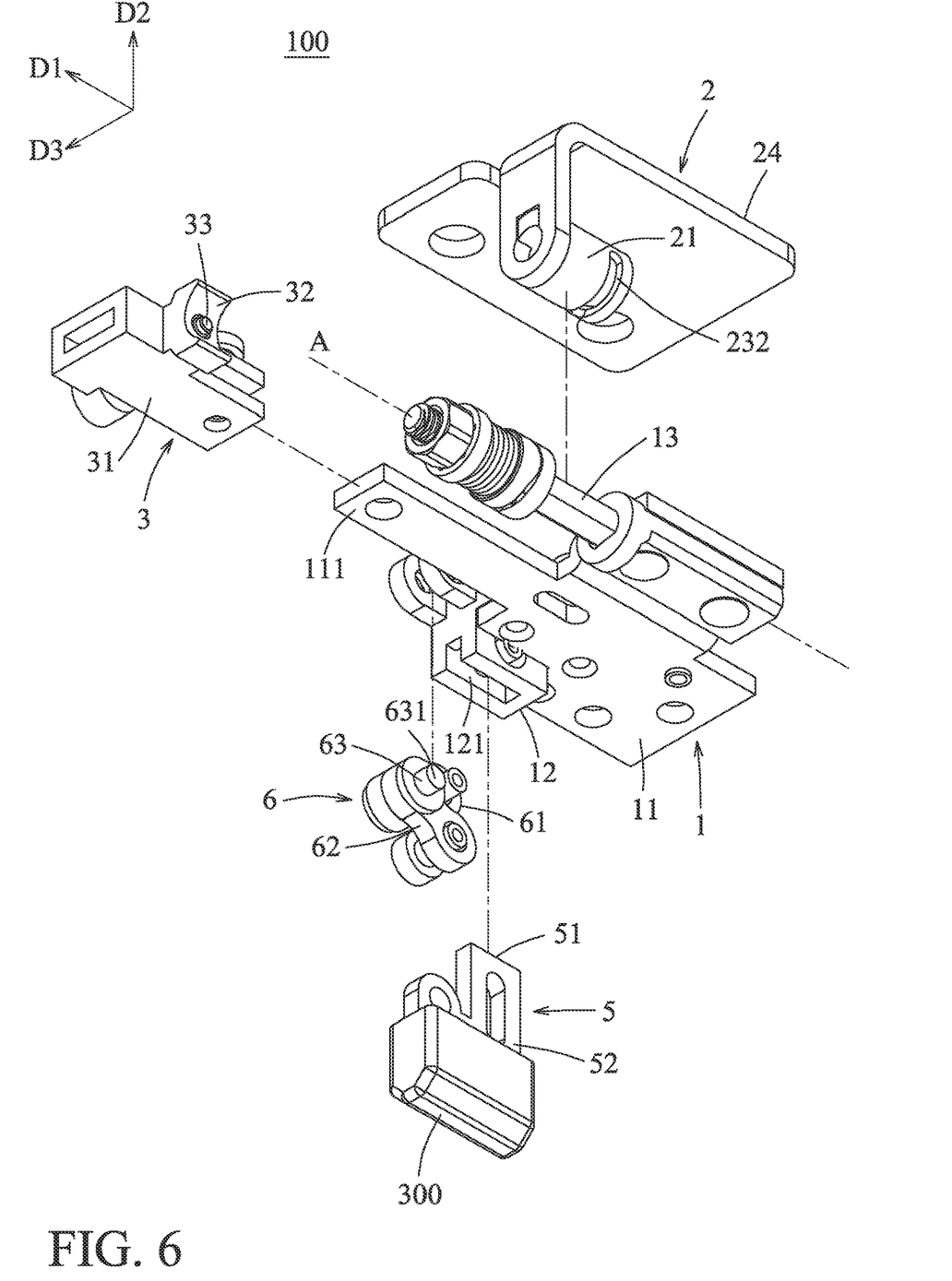
FIG. 6 is a partly exploded perspective view of the embodiment viewed from still another viewing angle.
Figure 7:
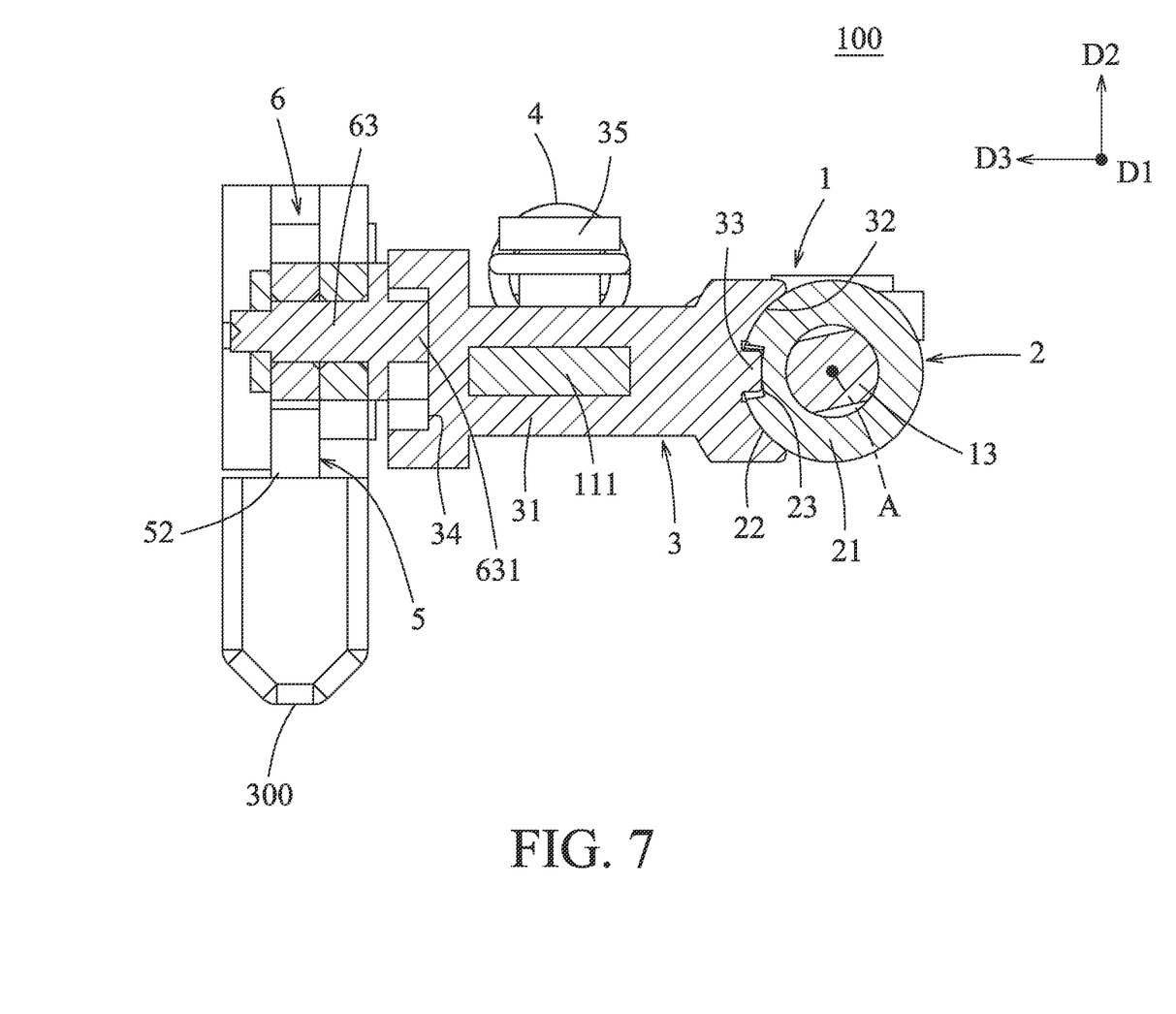
FIG. 7 is a sectional view of the embodiment.

Referring to FIGS. 6 and 7, in cooperation with FIGS. 2 and 4, the slide member 3 is disposed on the guide rod 111 of the base 1, and is slidable relative to the guide rod 111 between a first slide position (see FIG. 2) and a second slide position (see FIG. 9) in the left-right direction (D1). The slide member 3 has a slide sleeve 31, a concave curved surface 32, a slide engaging structure 33, a slide guiding structure 34, and a connecting structure 35. The slide sleeve 31 is sleeved on the guide rod 111, and is slidable relative to the guide rod 111 in the left-right direction (D1). The concave curved surface 32 is located at a rear side of the slide sleeve 31, and is coupled to the convex curved surface 22. The slide engaging structure 33 is formed on the concave curved surface 32, is configured to be a protrusion, is coupled to the rotation guiding structure 23, and is slidable along the rotation guiding structure 23. The slide guiding structure 34 is formed in a front side of the slide sleeve 31, is configured to be a groove, and extends in the up-down direction (D2). The connecting structure 35 is mounted to the slide sleeve 31. In this embodiment, the connecting structure 35 is configured to be a fastener (e.g., a bolt, a rivet, etc.).

Referring to FIGS. 2 and 4 again, the resistance-providing member 4 interconnects the connecting structure 35 of the slide member 3 and the connecting structure 14 of the base 1, and provides a force that prevents the slide member 3 from moving toward the first slide position when the slide member 3 is in the second slide position. In this embodiment, the resistance-providing member 4 is configured to be a spring, and the force that is provided by the resistance-providing member 4 is a restoring force of the resistance-providing member 4 when the resistance-providing member 4 is resiliently deformed (i.e., when the resistance-providing member 4 is resiliently deformed, the resistance-providing member 4 exerts the restoring force on the slide member 3 to prevent the slide member 3 from moving toward the first slide position). The slide member 3 is distal from the connecting structure 14 when in the first slide position, and is proximate to the connecting structure 14 when in the second slide position. When the slide member 3 is urged to slide toward the first slide position, the resistance-providing member 4 is stretched and resiliently biases the slide member 3 toward the second slide position. However, in one embodiment, the resistance-providing member 4 may be, for example, a friction plate, and the slide member 3 and the base 1 are clamped by the resistance-providing member 4 so that the resistance-providing member 4 may provide a frictional force that prevents the slide member 3 from moving toward the first slide position when the slide member 3 is in the second slide position.

Figure 9:
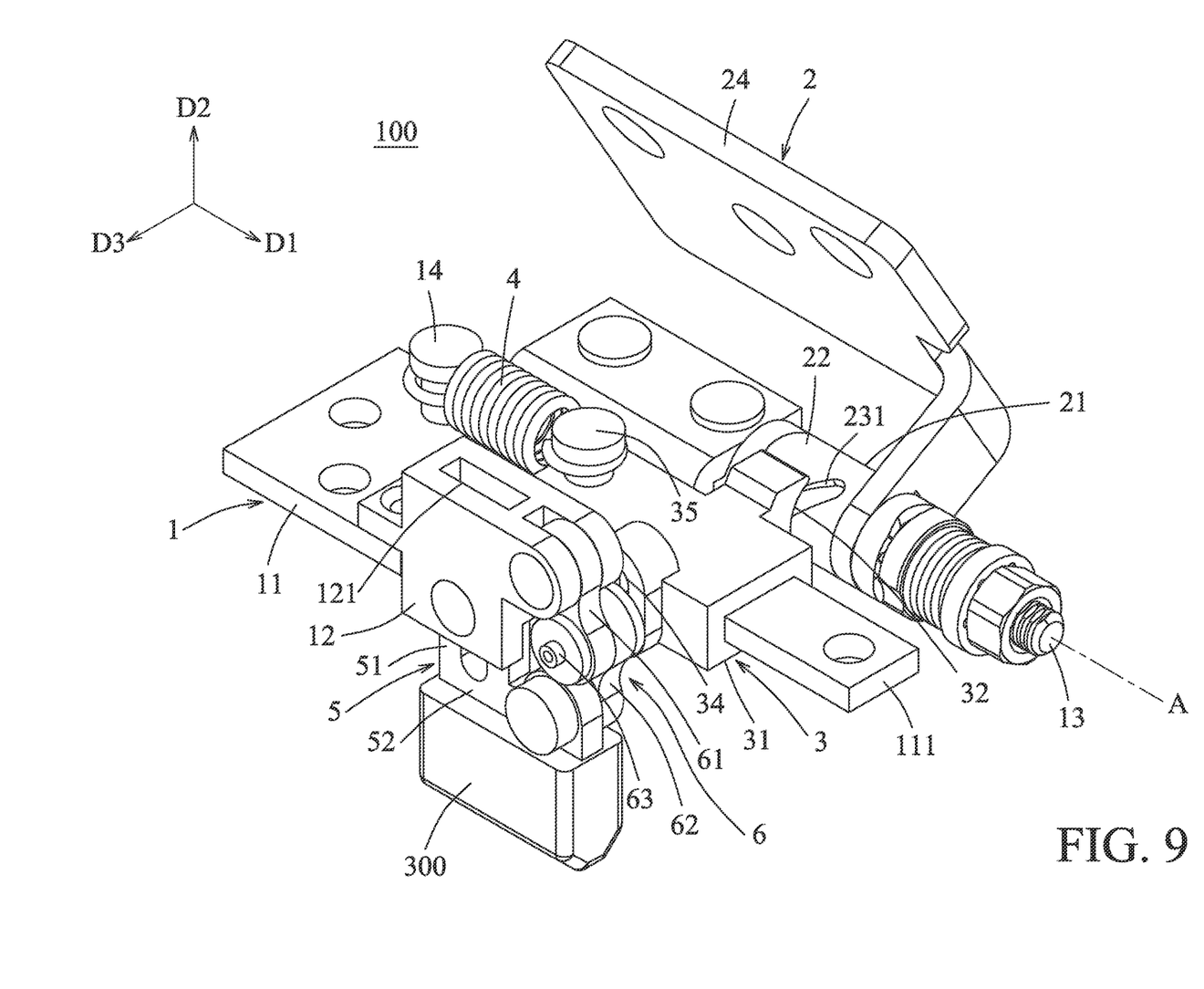
FIG. 9 is a perspective view of the embodiment illustrating the rotation member being in the transition position and the supporting member being in the supporting position.

Referring to FIGS. 1, 2, 4, and 6 again, the supporting member 5 is disposed on the guide hole 121 of the base 1, and is movable relative to the base 1 in the up-down direction (D2) between an initial position (see FIG. 2) and a supporting position (see FIG. 9). When the supporting member 5 is urged to move from the initial position to the supporting position, the supporting member 5 moves downwardly relative to the base 1. The supporting member 5 includes a slide rod 51 and a mounting structure 52. The slide rod 51 is inserted into the guide hole 121, and is slidable relative to the guide hole 121 in the up-down direction (D2). The mounting structure 52 is connected to a bottom portion of the slide rod 51, and is adapted for a foot pad 300 to be mounted thereto. The foot pad 300 that is mounted to the mounting structure 52 is located at the rear side of the first housing 201, extends through the first housing 201, and protrudes downwardly from a bottom portion of the first housing 201.

Referring to FIGS. 2, 4, 6, and 7 again, the linkage unit 6 includes a first link 61, a second link 62, and an interconnecting member 63. The first link 61 is pivotably connected to the second seat body 12 of the base 1. The second link 62 is located at a rear side of the first link 61, and is pivotably connected to the first link 61 and the mounting structure 52 of the supporting member 5. A portion of the second link 62 peeks out from under the first link 61. The interconnecting member 63 extends through a junction of the first link 61 and the second link 62 in the front-rear direction (D3), and interconnects the first link 61 and the second link 62. The interconnecting member 63 includes a linkage engaging structure 631. The linkage engaging structure 631 is disposed at the junction of the first link 61 and the second link 62, is configured to be a protrusion, is coupled to the slide guiding structure 34 of the slide member 3, and is slidable along the slide guiding structure 34. The linkage unit 6 is convertible between a folded state (see FIG. 2), in which the first link 61 and the second link 62 cooperatively define a first included angle on an imaginary plane that has a normal vector in the front-rear direction (D3), and an expanded state (see FIG. 9), in which the first link 61 and the second link 62 cooperatively define a second included angle on the imaginary plane. Each of the first and second included angles is located at one side of the linkage unit 6 that is adjacent to the slide rod 51 of the supporting member 5. The second included angle is greater than the first included angle.

Referring to FIGS. 1 to 3 again, when the rotation member 2 is in the first rotation position, the electronic device 200 is closed (i.e., the first housing 201 and the second housing are arranged in the up-down direction (D2), and a bottom surface of the second housing is close to a top surface of the first housing 201), the slide engaging structure 33 of the slide member 3 (see FIG. 6) is located at one end of the guiding section 231 of the rotation guiding structure 23 (see FIG. 4) opposite to the holding section 232 of the rotation guiding structure 23, and the slide member 3, the linkage unit 6, and the supporting member 5 are respectively in the first slide position, the folded state, and the initial position. At this time, because the slide member 3 is in the first slide position, the resistance-providing member 4 is stretched and resiliently deformed. In addition, the first link 61 and the second link 62 cooperatively define the first included angle. The electronic device 200 may further include at least one additional foot pad (not shown) that is mounted to a front side of the first housing 201, and that protrudes downwardly from the bottom portion of the first housing 201. When the rotation member 2 is in the first rotation position, the foot pad 300 that is mounted to the mounting structure 52 and that is located at the rear side of the first housing 201 may protrude downwardly from the bottom portion of the first housing 201 to the same extent as the at least one additional foot pad that is mounted to the front side of the first housing 201 does.

Figure 8:
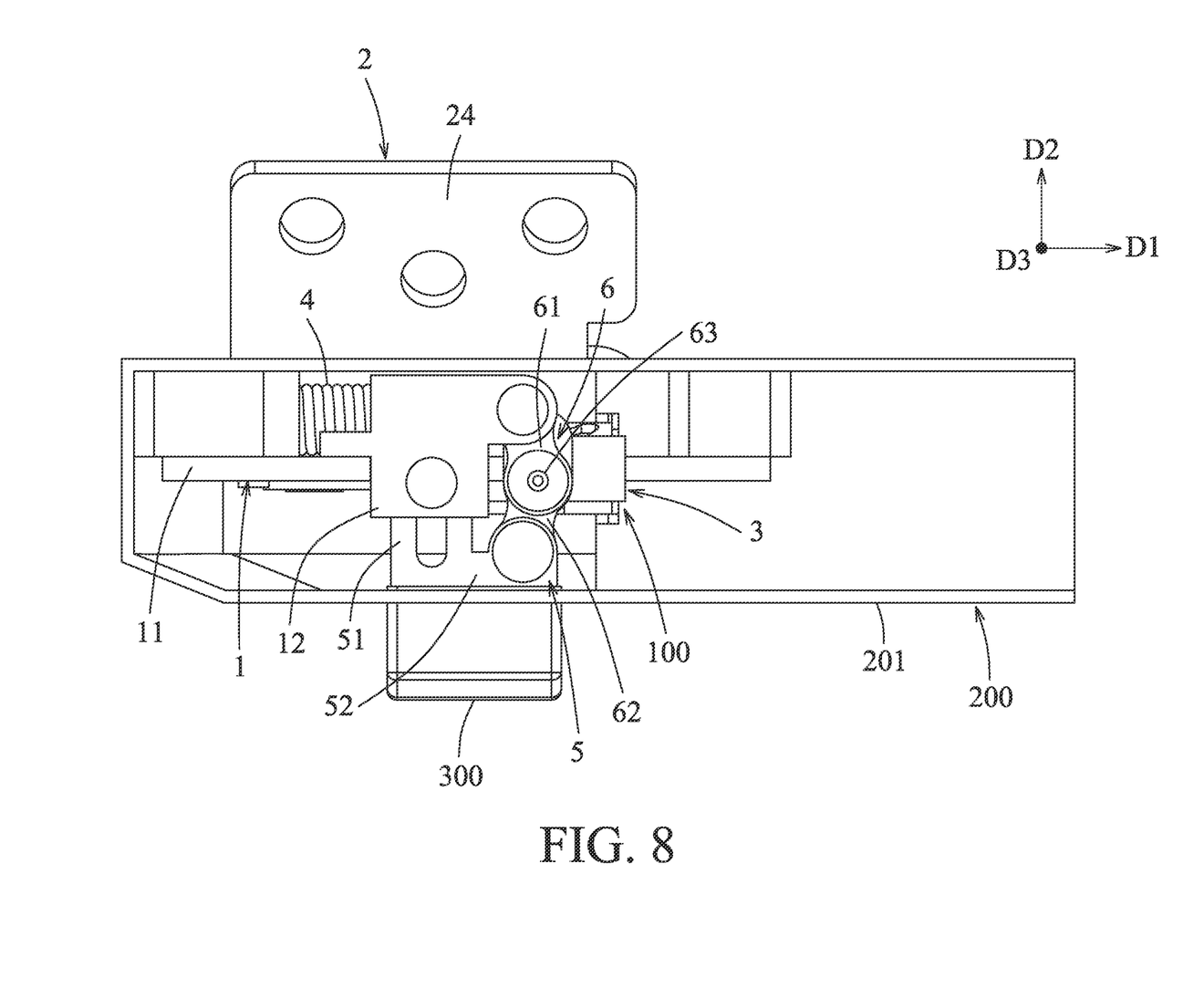
FIG. 8 is a view similar to FIG. 1, but illustrating the rotation member being in a transition position and the supporting member being in a supporting position.

Referring to FIG. 8, in cooperation with FIG. 9, when the rotation member 2 is rotated from the first rotation position to the transition position, the electronic device 200 is opened (i.e., the second housing is rotated relative to the first housing 201 such that the bottom surface of the second housing is away from the top surface of the first housing 201), the slide engaging structure 33 of the slide member 3 (see FIG. 6) arrives at a junction of the guiding section 231 and the holding section 232 of the rotation guiding structure 23 (see FIG. 5), the slide member 3 is urged by rotation of the rotation member 2 to slide in the left-right direction (D1) to the second slide position and to convert the linkage unit 6 into the expanded state (i.e., the first link 61 and the second link 62 cooperatively define the second included angle that is greater than the first included angle), and the supporting member 5 is urged by the second link 62 of the linkage unit 6 to move downwardly relative to the base 1 to the supporting position. At this time, because the supporting member 5 is urged by the second link 62 to move downwardly relative to the base 1 to the supporting position, the foot pad 300 that is mounted to the mounting structure 52 is urged to further protrude downwardly from the bottom portion of the first housing 201. Generally, when a user uses the electronic device 200, the foot pad 300 and the at least one additional foot pad abut against a plane that does not move. Consequently, when the supporting member 5 is urged to move downwardly relative to the base 1, and when the foot pad 300 that is mounted to the mounting structure 52 is urged to further protrude downwardly from the bottom portion of the first housing 201, the rear side of the first housing 201 is lifted by a force that the foot pad 300 exerts on the plane (i.e., the rear side of the first housing 201 is located above the front side of the first housing 201), thereby increasing a space for dissipating heat that is generated during operation of the electronic device 200 (i.e., the notebook computer), and offering greater comfort to the user when the user uses the keyboard of the first housing 201 of the electronic device 200. It is noted that, at this time, because the resistance-providing member 4 resiliently biases the slide member 3, the supporting member 5 is prevented from being urged by a weight of the electronic device 200 to move back to the initial position.

Figure 10:
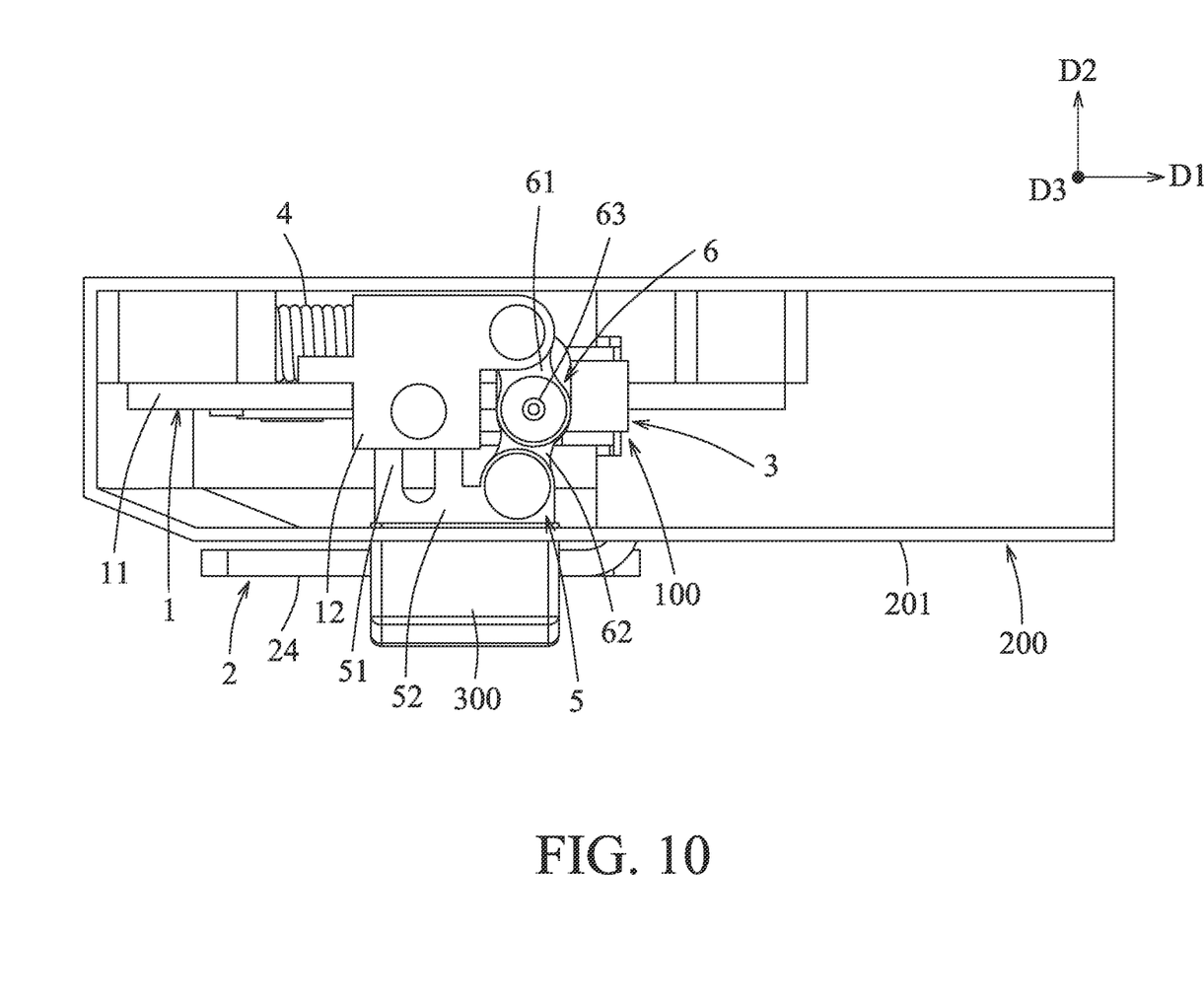
FIG. 10 is a view similar to FIG. 1, but illustrating the rotation member being in a second rotation position and the supporting member being in the supporting position.
Figure 11:
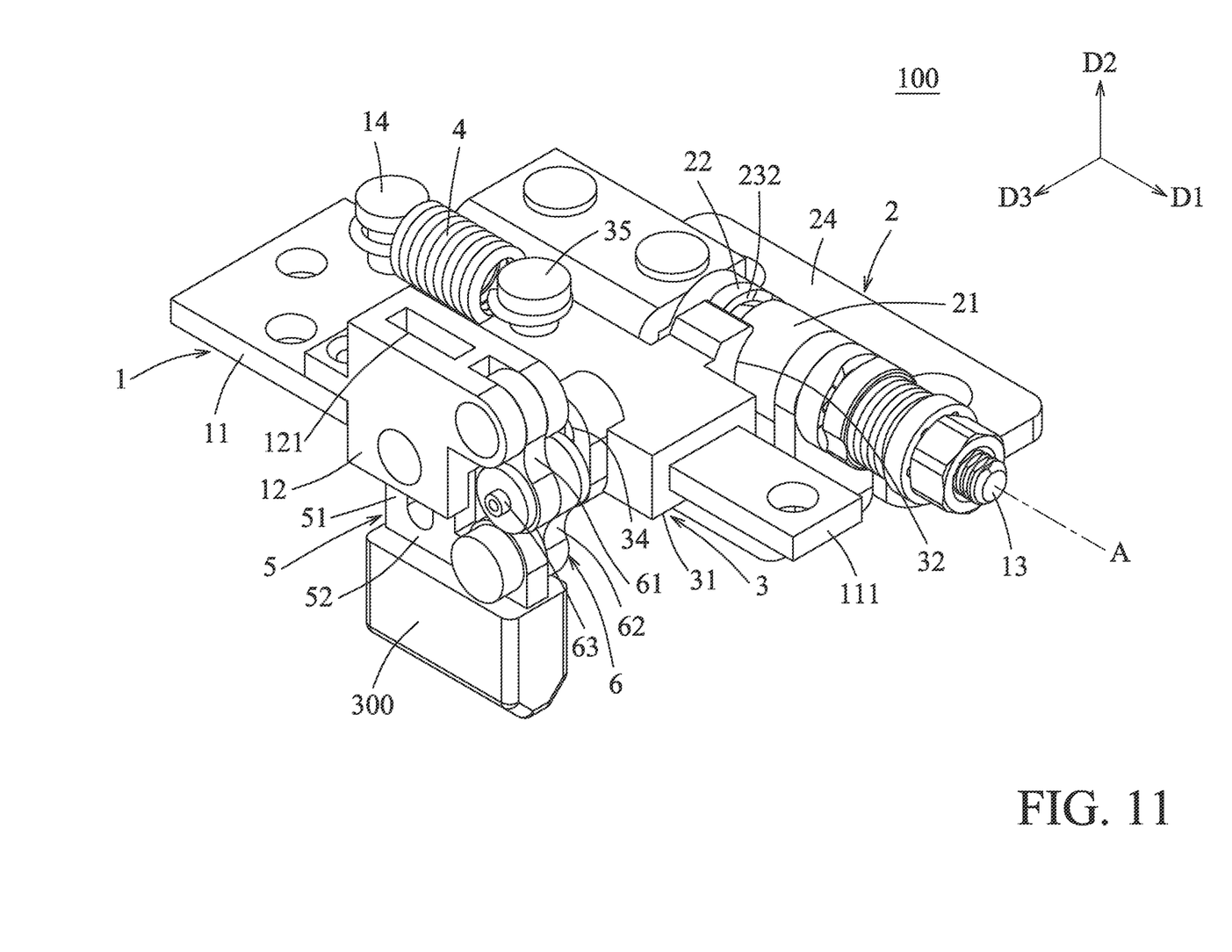
FIG. 11 is a perspective view of the embodiment illustrating the rotation member being in the second rotation position and the supporting member being in the supporting position.

Referring to FIG. 10, in cooperation with FIG. 11, when the rotation member 2 is rotated from the transition position to the second rotation position, the electronic device 200 is fully opened (i.e., the second housing is further rotated relative to the first housing 201 such that the bottom surface of the second housing is further away from the top surface of the first housing 201), the slide engaging structure 33 of the slide member 3 (see FIG. 6) arrives at one end of the holding section 232 of the rotation guiding structure 23 (see FIG. 6) opposite to the guiding section 231, and the slide member 3, the linkage unit 6, and the supporting member 5 respectively stay in the second slide position, the expanded state, and the supporting position. That is to say, when the rotation member 2 is rotated from the transition position to the second rotation position, the position of the supporting member 5 is not changed. It is noted that, during the rotation of the rotation member 2 between the transition position and second rotation position, the slide engaging structure 33 of the slide member 3 (see FIG. 6) slides along the holding section 232 of the rotation guiding structure 23 of the rotation member 2 (see FIG. 6). Moreover, when the rotation member 2 is rotated from the transition position to the second rotation position, because the holding section 232 extends around the rotation axis (A) on the imaginary plane that has the normal vector in the left-right direction (D1), a pressure that is exerted on the supporting member 5 by the weight of the electronic device 200 may not be transmitted to the rotation member 2 through the slide member 3. Consequently, the slide member 3 stays in the second slide position, the linkage unit 6 stays in the expanded state, and the supporting member 5 stays in the supporting position.

Afterwards, when the rotation member 2 is rotated back to the first rotation position, the electronic device 200 is closed (i.e., the first housing 201 and the second housing are arranged in the up-down direction (D2) again), and the supporting member 5 is urged to move back relative to the base 1 to the initial position. The manner in which the supporting member 5 is urged to move relative to the base 1 is deducible and so the details thereof are omitted. When the electronic device 200 is closed (i.e., when the rotation member 2 is in the first rotation position) and not in use, because the foot pad 300 that is mounted to the mounting structure 52 only protrudes downwardly from the bottom portion of the first housing 201 slightly, the electronic device 200 is easy to be stored.

Figure 12:
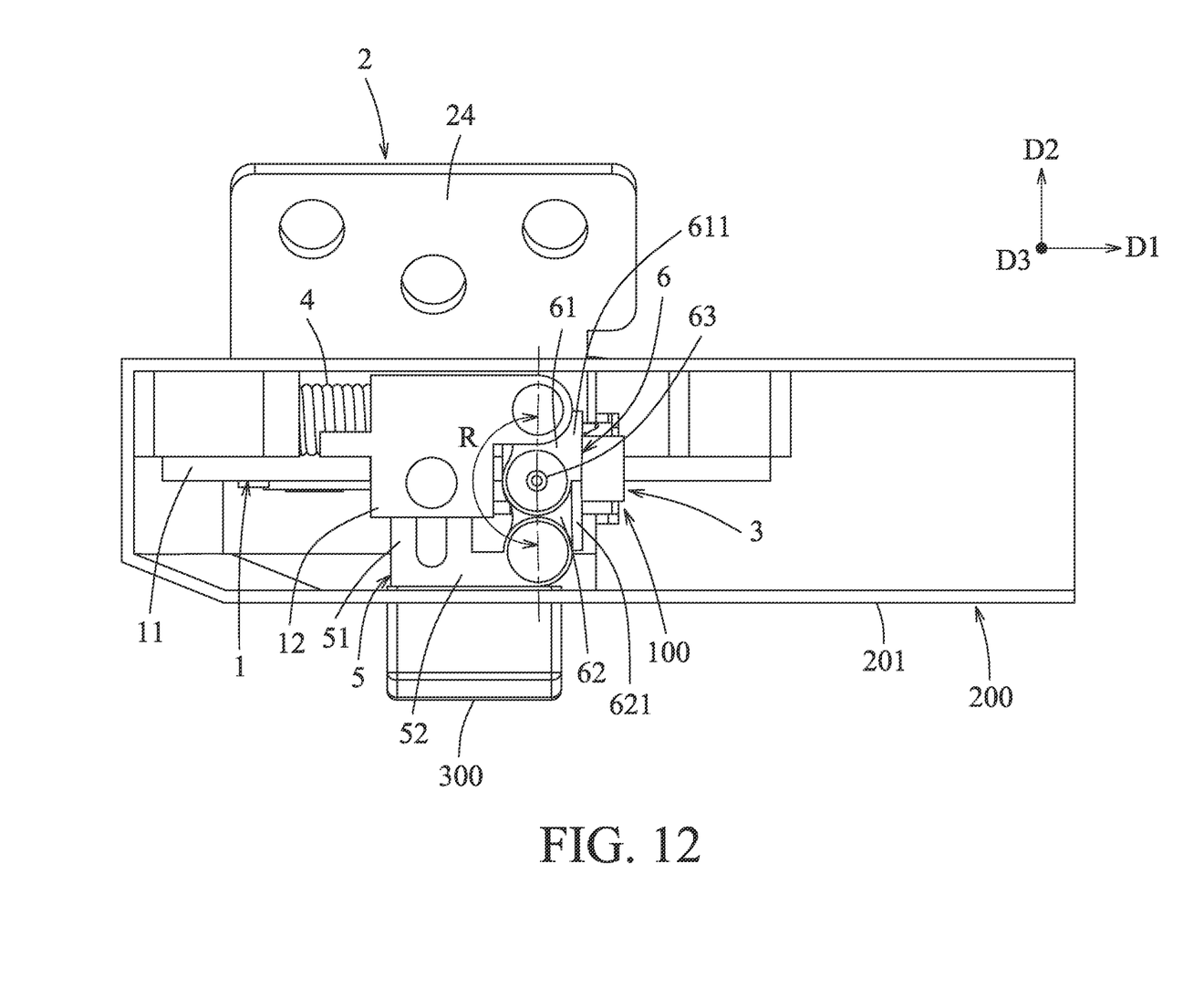
FIG. 12 is a schematic front view illustrating a modification of the embodiment.
Figure 13:
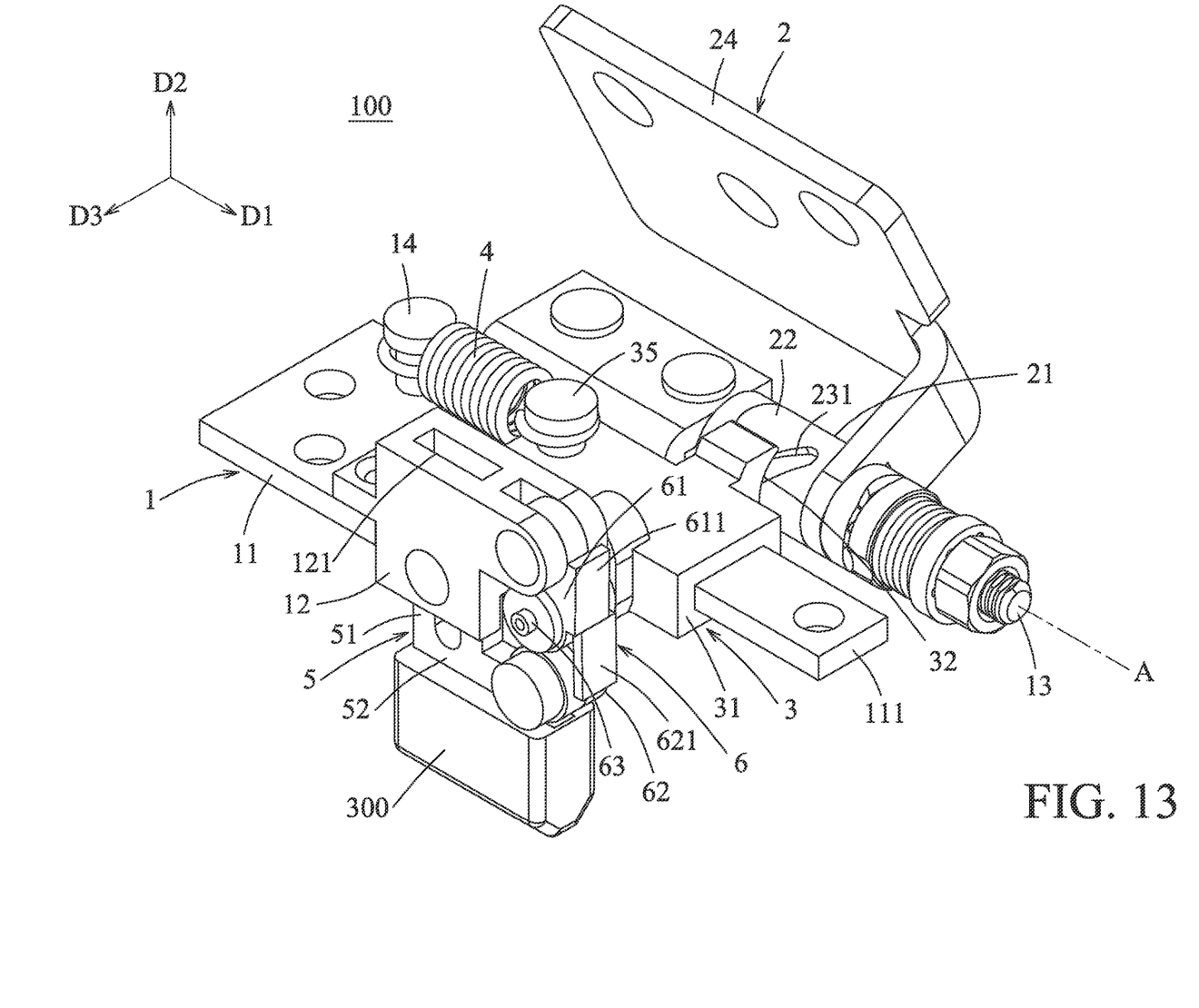
FIG. 13 is a perspective view illustrating the modification of the embodiment.

Referring to FIGS. 12 and 13, in a modification of the embodiment of the rotating shaft device 100 according to the disclosure, when the linkage unit 6 is in the expanded state, the first link 61 and the second link 62 cooperatively define an included angle (R) that is greater than 180 degrees, that is no greater than 185 degrees, and that is located at the one side of the linkage unit 6 adjacent to the slide rod 51 of the supporting member 5. Specifically, in the modification, the included angle (R) is about 181.8 degrees. At this time, an edge of the linkage unit 6 that is adjacent to the slide rod 51 may curve slightly toward the slide rod 51. The first link 61 has a first abutting structure 611. The second link 62 has a second abutting structure 621. When the linkage unit 6 is in the expanded state, the first abutting structure 611 of the first link 61 abuts against the second abutting structure 621 of the second link 62 to cooperatively carry the weight of the electronic device 200 that is exerted on the linkage unit 6 so that the pressure that is exerted on the supporting member 5 by the weight of the electronic device 200 may not be transmitted to the rotation member 2 through the linkage unit 6 and the slide member 3, thereby preventing the supporting member 5 from moving toward the initial position.

It is noted that, in this embodiment, the rotating shaft device 100 is configured to be a single-axis rotating shaft device. However, in another modification of the embodiment (not shown), the rotating shaft device 100 may be configured to be a dual-axis rotating shaft device. Specifically, in the another modification of the embodiment, the rotating shaft device 100 further includes another rotation member (not shown) that is connected to the rotation member 2, and the second housing is mounted to the another rotation member.

In summary, by virtue of the supporting member 5 being urged to move relative to the base 1 by movement of each of the slide member 3 and the linkage unit 6 and by the rotation of the rotation member 2, when the rotation member 2 is rotated from the first rotation position to the second rotation position and when the slide member 3 slides from the first slide position to the second slide position, the supporting member 5 is urged to move downwardly relative to the base 1 from the initial position to the supporting position. As such, when the rotating shaft device 100 is used in the electronic device 200, which may be a notebook computer, a rear side of the electronic device 200 (i.e., a rear side of the notebook computer) may be lifted conveniently by the foot pad 300 that is mounted to the supporting member 5, or, if the foot pad 300 is omitted, by the supporting member 5 when the user uses the notebook computer. Furthermore, by virtue of the resistance-providing member 4 that interconnects the slide member 3 and the base 1 resiliently biasing the slide member 3 toward the second slide position, when the slide member 3 is in the second slide position, the slide member 3 may be prevented from moving toward the first slide position, thereby preventing the supporting member 5 from being urged by the weight of the electronic device 200 to move from the supporting position to the initial position.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A rotating shaft device comprising:
   a base;
   a rotation member disposed on the base and rotatable relative to the base about a rotation axis between a first rotation position and a second rotation position, the rotation axis extending in a left-right direction, the rotation member having a rotation guiding structure that at least partially surrounds the rotation axis;
   a slide member disposed on the base and slidable relative to the base between a first slide position and a second slide position in the left-right direction, the slide member having a slide engaging structure that is coupled to the rotation guiding structure and that is slidable along the rotation guiding structure, and a slide guiding structure that extends in an up-down direction;
   a resistance-providing member interconnecting the slide member and the base, and providing a force that prevents the slide member from moving toward the first slide position when the slide member is in the second slide position;
   a supporting member disposed on the base and movable relative to the base between an initial position and a supporting position; and
   a linkage unit including a first link that is pivotally connected to the base, a second link that is located at one side of the first link, and that is pivotally connected to the first link and the supporting member, and a linkage engaging structure that is disposed at a junction of the first link and the second link, that is coupled to the slide guiding structure of the slide member, and that is slidable along the slide guiding structure, a portion of the second link peeking out from under the first link, the linkage unit being convertible between a folded state and an expanded state, when the rotation member is in the first rotation position, the slide member, the linkage unit, and the supporting member being respectively in the first slide position, the folded state, and the initial position, when the rotation member is rotated to the second rotation position, the slide member being urged by rotation of the rotation member to slide in the left-right direction to the second slide position and to convert the linkage unit into the expanded state, and the supporting member being urged by the second link of the linkage unit to move downwardly to the supporting position.

2. The rotating shaft device as claimed in claim 1, wherein the resistance-providing member is configured to be a spring.

3. The rotating shaft device as claimed in claim 2, wherein the base has a connecting structure that is connected to the resistance-providing member, the slide member being distal from the connecting structure when in the first slide position, and being proximate to the connecting structure when in the second slide position, the resistance-providing member resiliently biasing the slide member toward the second slide position.

4. The rotating shaft device as claimed in claim 1, wherein:
the rotation member is rotatable relative to the base among the first rotation position, the second rotation position, and a transition position that is between the first rotation position and the second rotation position, the rotation guiding structure of the rotation member having a guiding section that extends around the rotation axis in a direction which is oblique to the left-right direction, and a holding section that extends around the rotation axis on an imaginary plane which has a normal vector in the left-right direction, and that is connected to the guiding section;
when the rotation member is in the first rotation position, the slide engaging structure of the slide member is located at one end of the guiding section of the rotation guiding structure opposite to the holding section of the rotation guiding structure, and the slide member, the linkage unit, and the supporting member are respectively in the first slide position, the folded state, and the initial position;
when the rotation member is rotated from the first rotation position to the transition position, the slide engaging structure of the slide member arrives at a junction of the guiding section and the holding section, the slide member is urged by the rotation of the rotation member to slide in the left-right direction to the second slide position and to convert the linkage unit into the expanded state, and the supporting member is urged by the second link of the linkage unit to move downwardly to the supporting position; and
when the rotation member is rotated from the transition position to the second rotation position, the slide engaging structure of the slide member arrives at one end of the holding section opposite to the guiding section, and the slide member, the linkage unit, and the supporting member respectively stay in the second slide position, the expanded state, and the supporting position.

5. The rotating shaft device as claimed in claim 1, wherein when the linkage unit is in the expanded state, the first link and the second link cooperatively define an included angle that is greater than 180 degrees.

6. The rotating shaft device as claimed in claim 5, wherein when the linkage unit is in the expanded state, the included angle that is defined by the first link and the second link is no greater than 185 degrees.

7. The rotating shaft device as claimed in claim 5, wherein the first link has a first abutting structure, the second link having a second abutting structure, when the linkage unit is in the expanded state, the first abutting structure of the first link abutting against the second abutting structure of the second link.

* * * * *